United States Patent
Kanae et al.

(10) Patent No.: US 7,163,983 B2
(45) Date of Patent: *Jan. 16, 2007

(54) OLEFINIC THERMOPLASTIC ELASTOMER SHEET, PROCESS FOR PRODUCTION THEREOF, AND LAMINATES

(75) Inventors: Kentarou Kanae, Tokyo (JP); Toshiyuki Hayakawa, Tokyo (JP); Minoru Tanaka, Tokyo (JP); Akihiko Morikawa, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/540,568

(22) PCT Filed: Dec. 24, 2003

(86) PCT No.: PCT/JP03/16630

§ 371 (c)(1),
(2), (4) Date: Jun. 24, 2005

(87) PCT Pub. No.: WO2004/060937

PCT Pub. Date: Jul. 22, 2004

(65) Prior Publication Data

US 2006/0154038 A1    Jul. 13, 2006

(30) Foreign Application Priority Data

Dec. 27, 2002    (JP) .............................. 2002-379677

(51) Int. Cl.
*C08F 8/42* (2006.01)
*B32B 27/06* (2006.01)

(52) U.S. Cl. .................. 525/327.8; 525/195; 525/196; 525/329.5; 525/919; 428/220; 428/441; 428/461; 428/500; 428/511

(58) Field of Classification Search ................ 525/195, 525/196, 329.5, 919, 327.8, 367, 369, 370, 525/373, 371; 428/220, 441, 461, 500, 511

See application file for complete search history.

(56) References Cited

U.S. PATENT DOCUMENTS

| 4,587,304 A | 5/1986 | Thaler et al. |
| 6,653,401 B1 * | 11/2003 | Kinoshita et al. .............. 525/70 |
| 6,670,426 B1 * | 12/2003 | Kanae et al. ............. 525/329.5 |
| 2001/0016620 A1 * | 8/2001 | Itoh et al. .................... 524/528 |
| 2005/0096437 A1 | 5/2005 | Kanae et al. |

FOREIGN PATENT DOCUMENTS

| EP | 1 577 343 | 9/2005 |
| JP | 4-93340 | 3/1992 |
| JP | 04-296338 | 10/1992 |

OTHER PUBLICATIONS

U.S. Appl. No. 10/540,568, filed Jun. 24, 2005, Kanae et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

An olefin thermoplastic elastomer sheet which has the same or similar rubber elasticity, flexibility and molding and processability as those of the conventional olefin thermoplastic elastomer sheets, and is good in mechanical properties and excellent in mar resistance in particular, and a production process thereof, and a laminate having a surface layer composed of this sheet. The olefin thermoplastic elastomer sheet according to the present invention is composed of an elastomer material comprising an olefin random copolymer formed by copolymerizing ethylene, an α-olefin having 3 to 10 carbon atoms and an unsaturated monomer having a functional group, and optionally a non-conjugated diene, and metal ions crosslinking the olefin random copolymer.

12 Claims, No Drawings

OLEFINIC THERMOPLASTIC ELASTOMER SHEET, PROCESS FOR PRODUCTION THEREOF, AND LAMINATES

TECHNICAL FIELD

The present invention relates to an olefinic thermoplastic elastomer sheet and a production process thereof, and a laminate having a surface layer composed of this sheet, and more particularly to an olefinic thermoplastic elastomer sheet excellent in rubber elasticity, flexibility, mechanical properties, mar resistance and molding or forming and processing ability and a production process, and a laminate thereof.

BACKGROUND ART

Olefinic thermoplastic elastomer sheets attract attention as substitutive sheets for, for example, polyvinyl chloride sheets widely used as automobile interior skin materials and vulcanized rubber sheets used in a wide variety of fields because of such merits that they are excellent in heat resistance, weather resistance and cold resistance, are capable of being formed or molded by the same processes as in thermoplastic resins, are capable of being recycled and are comparatively cheap.

As olefinic thermoplastic elastomer materials, there have been known those obtained by mixing an olefin resin with an olefin copolymer rubber, those obtained by partially crosslinking an olefin resin and an olefin copolymer rubber with a crosslinking agent, and the like (see, for example, the following Prior Art. 1).

Since the conventional olefinic thermoplastic elastomer sheets are low in resistance to surface marring (mar resistance), however, the elastomer sheets involve a problem that they are unsuitable for use as skin materials for automobile interior parts, for example, inner panels and console boxes, of which the mar resistance is required.

Prior Art. 1: Japanese Patent Application Laid-Open No. 2000-26668.

DISCLOSURE OF THE INVENTION

The present invention has been made on the basis of the foregoing circumstances and objects thereof are to provide an olefinic thermoplastic elastomer sheet which has the same rubber elasticity, flexibility and molding or forming and processing ability as those of the conventional olefinic thermoplastic elastomer sheets and is good in mechanical properties and excellent in mar resistance in particular, and a production process thereof, and a laminate having a surface layer composed of this sheet.

According to the present invention, there is provided an olefinic thermoplastic elastomer sheet composed of an elastomer material comprising an olefin random copolymer obtained by copolymerizing ethylene, an α-olefin having 3 to 10 carbon atoms and an unsaturated monomer having a functional group, and optionally a non-conjugated diene, and a metal ion for crosslinking the olefin random copolymer.

In the olefinic thermoplastic elastomer sheet according to the present invention, the unsaturated monomer having the functional group may preferably be a functional cyclic compound represented by the following general formula (1):

General formula (1):

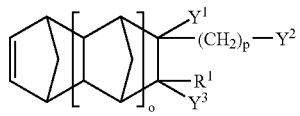

wherein $R^1$ means a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or —COOH, with the proviso that at least one of $Y^1$, $Y^2$ and $Y^3$ is —COOH, and when at least two of $Y^1$, $Y^2$ and $Y^3$ are —COOH, they may be bonded to each other to form an acid anhydride (—CO—(O)—CO—), o is an integer of 0 to 2, and p is an integer of 0 to 5.

In the olefinic thermoplastic elastomer sheet according to the present invention, the elastomer material may further comprise a polymeric compound selected from a thermoplastic resin, a thermoplastic elastomer and rubber, and/or a softening agent.

The elastomer sheet may preferably have a thickness of 10 μm to 2 cm.

According to the present invention, there is provided a process for producing an olefinic thermoplastic elastomer sheet, which comprises forming or molding the elastomer material described above by extrusion, calendaring, solvent casting, injection molding, vacuum forming, powder slush molding or hot pressing.

According to the present invention, there is provided a laminate comprising a surface layer composed of the olefinic thermoplastic elastomer sheet described above.

In the laminate according to the present invention, a lower lamination may preferably be composed of a material selected from the group consisting of rubbers, plastics, thermoplastic elastomers, glass, metals, fabrics and wood.

EFFECTS OF THE INVENTION

The olefinic thermoplastic elastomer sheets according to the present invention have rubber elasticity, flexibility and molding or forming and processing ability of the same degree as those of the conventional olefinic thermoplastic elastomer sheets, moreover are good in mechanical properties and excellent in mar resistance in particular, and are capable of being easily produced by melt molding or forming such as injection molding, extrusion, blow molding, compression molding, vacuum forming, powder slush molding, laminate molding or calendaring, or solvent casting.

Since the olefinic thermoplastic elastomer sheets according to the present invention have good adhesiveness to other materials, they are capable of being easily laminated integrally on the surface of a lower lamination composed of another material into laminates.

Accordingly, the olefinic thermoplastic elastomer sheets according to the present invention and the laminates having a surface layer composed of such a sheet can be widely used as interior or exterior skin materials for automobile bumpers, exterior moldings, window sealing gaskets, door sealing gaskets, trunk sealing gaskets, roof side rails, emblems, inner panels, door trims, console boxes, etc., in which the conventional olefinic thermoplastic elastomers are in use, weatherstrips and the like, leather sheets of which mar resistance is required, sealing materials, interior or exterior skin materials and the like for aircrafts and marine vessels, sealing materials, interior or exterior skin materials, waterproofing sheet materials and the like for civil engineering and construction, sealing materials and the like for general machines and apparatus, packings, skin materials, housings and the like for light electric parts, rolls and cleaning blades for information instruments, films for electronic parts, protecting films in the fabrication process of semiconductor, and flat panel displays (FPD) such as liquid crystal display devices, sealing materials, protecting films for images such as photographs, decorative films for building materials, medical instrument parts, electric wires, and general processed products such as daily needs and sports goods.

According to the production process of the present invention, the above-described olefinic thermoplastic elastomer sheets can be produced with advantage.

BEST MODE FOR CARRYING OUT THE INVENTION

The embodiments of the present invention will hereinafter be described in detail.

The olefinic thermoplastic elastomer sheet according to the present invention is composed of an elastomer material comprising an olefin random copolymer (hereinafter referred to as "specific functional group-containing copolymer") obtained by copolymerizing at least ethylene, an (α-olefin having 3 to 10 carbon atoms and monomer having a functional group, and a metal ion for crosslinking the specific functional group-containing copolymer.

The term "sheet" as used in the present invention is a term including those called "film" in addition to those generally called "sheet".

[Specific functional group-containing copolymer]

In the specific functional group-containing copolymer making up the olefinic thermoplastic elastomer sheet according to the present invention, ethylene is used as an essential monomer component.

The proportion of ethylene used is preferably 35 to 94.99 mol %, more preferably 40 to 89.99 mol %, particularly preferably 45 to 84.99 mol % based on the whole monomer component.

If the proportion of ethylene used is less than 35 mol %, it may be difficult in some cases to copolymerize a functional cyclic compound, which will be described subsequently. If the proportion of ethylene used exceeds 94.99 mol % on the other hand, it may be difficult in some cases to achieve rubber elasticity required of the resulting thermoplastic elastomer sheet.

In the specific functional group-containing copolymer, an α-olefin (hereinafter referred to as "specific α-olefin") having 3 to 10 carbon atoms is also used as an essential monomer. When the α-olefin having at most 10 carbon atoms is used, the copolymerizability of such an α-olefin with other monomers becomes satisfactory.

As specific examples of the specific α-olefin, may be mentioned propylene, 1-butene, 1-pentene, 4-methylpentene-1, 1-hexene, 1-heptene, 1-octene and 1-decene. Among these, propylene, 1-butene, 1-hexene and 1-octene are preferred, with propylene and 1-butene being more preferred.

These compounds may be used either singly or in any combination thereof.

The proportion of the specific α-olefin used is preferably 5 to 50 mol %, more preferably 10 to 45 mol %, particularly preferably 15 to 40 mol % based on the whole monomer component.

If the proportion of the specific α-olefin used is less than 5 mol %, it may be difficult in some cases to achieve rubber elasticity required of the resulting thermoplastic elastomer sheet. If the proportion of the specific α-olefin used exceeds 50 mol % on the other hand, the durability of the resulting thermoplastic elastomer sheet may be deteriorated in some cases.

In the specific functional group-containing copolymer, an unsaturated monomer (hereinafter referred to as "functional group-containing unsaturated monomer") having a functional group crosslinkable to a metal ion is additionally used as an essential monomer component. This functional group-containing unsaturated monomer preferably has a carboxyl group, hydroxyl group, epoxy group or sulfonic group as the functional group.

As such a functional group-containing unsaturated monomer, is preferably used a functional cyclic compound (hereinafter referred to as "specific functional cyclic compound") represented by the above general formula (1).

In the general formula (1) representing the specific functional cyclic compound, $R^1$ is a hydrogen atom or a hydrocarbon group having 1 to 10 carbon atoms, $Y^1$, $Y^2$ and $Y^3$ are, independently of one another, a hydrogen atom, a hydrocarbon group having 1 to 10 carbon atoms or —COOH, with the proviso that at least one of $Y^1$, $Y^2$ and $Y^3$ is —COOH. When at least two of $Y^1$, $Y^2$ and $Y^3$ are —COOH, they may be bonded to each other to form an acid anhydride (—CO—(O)—CO—).

As specific examples of the hydrocarbon group having 1 to 10 carbon atoms, may be mentioned methyl, ethyl, propyl, butyl, pentyl, hexyl, heptyl, octyl, nonyl and decyl groups.

The repetition number o is an integer of 0 to 2. If the repetition number o is 3 or more, it may be difficult in some cases to copolymerize such a cyclic compound with other monomers. The repetition number p is an integer of 0 to 5.

Such a specific functional cyclic compound may be prepared by condensing cyclopentadiene with a functional group-containing unsaturated compound by the Diels-Alder reaction.

As specific examples of the specific functional cyclic compound, may be mentioned:
  5,6-dimethyl-5,6-dicarboxy-bicyclo[2.2.1]-2-heptene,
  5,6-diethyl-5,6-dicarboxy-bicyclo[2.2.1]-2-heptene,
  5,6-dimethyl-5,6-bis(carboxymethyl)-bicyclo[2.2.1]-2-heptene,
  5,6-diethyl-5,6-bis(carboxymethyl)-bicyclo[2.2.1]-2-heptene,
  5-methyl-5-carboxy-bicyclo[2.2.1]-2-heptene,
  5-ethyl-5-carboxy-bicyclo[2.2.1]-2-heptene,
  5-carboxy-5-carboxymethyl-bicyclo[2.2.1]-2-heptene,
  5-methyl-5-carboxymethyl-bicyclo[2.2.1]-2-heptene,
  5-ethyl-5-carboxymethyl-bicyclo[2.2.1]-2-heptene,
  8,9-dimethyl-8,9-dicarboxy-tetracyclo-[4.4.0.1$^{2,5}$.1$^{7,10}$]-3-dodecene,
  8,9-diethyl-8,9-dicarboxy-tetracyclo-[4.4.0.1$^{2,5}$.1$^{7,10}$]-3-dodecene,
  8-methyl-8-carboxy-tetracyclo[4.4.0.1$^{2,5}$.1$^{7,10}$]-3-dodecene, and 8-ethyl-8-carboxy-tetracyclo[4.4.0.1$^{2,5}$.1$^{7,10}$]-3-dodecene.

The proportion of the functional group-containing unsaturated monomer used is preferably 0.01 to 5 mol %, more preferably 0.01 to 4 mol % based on the whole monomer component.

If the proportion of the functional group-containing unsaturated monomer used is less than 0.01 mol %, the resulting olefinic thermoplastic elastomer sheet becomes low in the crosslinking density, and the mechanical strength and mar resistance thereof are liable to lower. If the proportion of the functional group-containing unsaturated monomer used exceeds 5 mol % on the other hand, the crosslinking density of the resulting olefinic thermoplastic elastomer sheet becomes too high, and so the flowability thereof may possibly be lowered. It is hence not preferable to use the functional group-containing unsaturated monomer in such a low or high proportion.

In the specific functional group-containing copolymer, a non-conjugated diene may be used as an optional monomer component in addition to the above-described essential monomer components.

As specific examples of the non-conjugated diene, may be mentioned linear acyclic dienes such as 1,4-hexadiene, 1,6-hexadiene and 1,5-hexadiene, branched-chain acyclic dienes such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene and dihydromyrcene, and alicyclic dienes such as tetrahydroindene, methyl-tetrahydroindene, dicyclopentadiene, bicyclo[2.2.1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene and 5-vinyl-2-norbornene. These compounds may be used either singly or in any combination thereof.

As preferred compounds among the above-mentioned non-conjugated dienes, may be mentioned 1,4-hexadiene, dicyclopentadiene and 5-ethylidene-2-norbornene.

The proportion of the non-conjugated diene used is preferably 0 to 10 mol % based on the whole monomer component. If the proportion of the non-conjugated diene used exceeds 10 mol %, the durability of the resulting thermoplastic elastomer sheet may become low in some cases.

The specific functional group-containing copolymer has a weight average molecular weight Mw of generally 1,000 to 3,000,000, preferably 3,000 to 1,000,000, more preferably 5,000 to 700,000 reduced to polystyrene as measured by gel permeation chromatography (GPC).

The specific functional group-containing copolymer preferably has a melt flow rate (MFR) of 0.01 to 100 g/10 min, more preferably 0.05 to 50 g/10 min as measured under conditions of a temperature of 230° C. and a load of 10 kg.

Further, the specific functional group-containing copolymer preferably has a glass transition temperature of −90 to 50° C, particularly −70 to 10° C.

The specific functional group-containing copolymer may be an oil-extended polymer obtained by adding a softening agent upon polymerization.

[Metal ion]

The metal ion used in the present invention ionically bonds to the functional group in the specific functional group-containing copolymer, thereby forming a crosslinked structure between molecules of the specific functional group-containing copolymer. As examples of such a metal ion, may be mentioned ions of metals of Groups I to VIII in the periodic table, such as lithium, potassium, sodium, aluminum, magnesium, calcium, barium, cesium, strontium, rubidium, titanium, zinc, copper, iron, tin, lead and zirconium. Among these, are preferred metal ions of potassium, sodium, aluminum magnesium, barium, zinc, iron, zirconium, calcium, titanium and lead.

[Other Components]

In the elastomer material forming the olefinic thermoplastic elastomer sheet according to the present invention, the polymeric compound selected from thermoplastic resin, thermoplastic elastomer and rubber may be contained.

No particular limitation is imposed on such polymeric compound so far as it is other compound than the specific functional group-containing copolymer, and various compounds may be used. Specific examples thereof include ionomers, aminoacrylamide polymers, polyethylene and maleic anhydride-grafted polymers thereof, polyisobutylene, ethylene-vinyl chloride polymers, ethylene-vinyl alcohol polymers, ethylene-vinyl acetate copolymers, polyethylene oxide, ethylene-acrylic acid copolymers, polypropylene and maleic anhydride-grafted polymers thereof, polyisobutylene and maleic anhydride-grafted polymers thereof, chlorinated polypropylene, 4-methylpentene-1 resins, polystyrene, ABS resins, ACS resins, AS resins, AES resins, ASA resins, MBS resins, acrylic resins, methacrylic resins, vinyl chloride resins, vinylidene chloride resins, polyamide resins, polycarbonate, acrylic resins, methacrylic resins, vinyl chloride resins, vinylidene chloride resins, vinyl alcohol resins, vinyl acetal resins, methyl methacrylate resins, fluororesins, polyether resins, polyethylene terephthalate, polyacrylates, polyamide resins, ethylene•α-olefin copolymer rubber and maleic anhydride-grafted polymers thereof, ethylene•α-olefin•non-conjugated diene terpolymer rubber, styrene•butadiene rubber and hydrogenated products thereof, maleic anhydride-grafted polymers of hydrogenated products of styrene•butadiene rubber, butadiene rubber and hydrogenated products thereof, maleic anhydride-grafted polymers of hydrogenated products of butadiene rubber, isoprene rubber and hydrogenated products thereof, maleic anhydride-grafted polymers of hydrogenated products of isoprene rubber, styrene•isoprene rubber and hydrogenated products thereof, maleic anhydride-grafted polymers of hydrogenated products of styrene•isoprene rubber, nitrile rubber and hydrogenated products thereof, acrylic rubber, silicone rubber, fluororubber, butyl rubber, natural rubber, chlorinated polyethylene type thermoplastic elastomers, syndiotactic 1,2-polybutadiene, hydrogenated products of styrene•butadiene block copolymers, hydrogenated products of styrene•isoprene block copolymers, simple blend type olefinic thermoplastic elastomers, implant type olefinic thermoplastic elastomers, dynamic crosslinking type olefinic thermoplastic elastomers, polyvinyl chloride type thermoplastic elastomers, polyurethane type thermoplastic elastomers, polyester type thermoplastic elastomers, polyamide type thermoplastic elastomers, and fluorine-containing thermoplastic elastomers. Polyethylene, polypropylene, hydrogenated products of styrene•butadiene rubber and hydrogenated products of butadiene rubber are particularly preferred. These polymeric compounds may be used either singly or in any combination thereof.

The proportion of the polymeric compound used is at most 300 parts by weight, preferably 1 to 200 parts by weight per 100 parts by weight of the specific functional group-containing copolymer.

A softening agent may be contained in the elastomer material.

This softening agent may be added into a monomer solution for obtaining the specific functional group-containing copolymer, or upon the preparation of the elastomer material or the production of the sheet.

No particular limitation is imposed on such a softening agent so far as it is a softening agent generally used for rubber. Examples thereof include petroleum hydrocarbons such as paraffinic, naphthenic and aromatic hydrocarbons, and low-molecular weight hydrocarbons of polybutene and polybutadiene types. Among these, petroleum hydrocarbons are preferred, and those having a molecular weight of 300 to 2,000, particularly 500 to 1,500 in terms of weight average molecular weight are preferred.

A softening agent for rubber composed of a petroleum hydrocarbon is generally a mixture of 3 hydrocarbons of an aromatic hydrocarbon, naphthenic hydrocarbon and paraffinic hydrocarbon. The softening agent is classified as paraffinic oil if the number of carbon atoms in the paraffinic hydrocarbon accounts for at least 50% of the total number of carbon atoms, the softening agent is classified as naphthenic oil if the number of carbon atoms in the naphthenic hydrocarbon accounts for 30 to 45% of the total number of carbon atoms, and the softening agent is classified as aromatic oil if the number of carbon atoms in the aromatic hydrocarbon accounts for at least 30% of the total number of carbon atoms. In the present invention, the paraffinic oil is preferred, with hydrogenated paraffinic oil being particularly preferred. The petroleum hydrocarbons preferably have a kinematic viscosity of 20 to 800 cSt, particularly 50 to 600 cSt at 40° C. and a pour point of −40 to 0° C., particularly −30 to 0° C.

The proportion of the softening agent used is at most 100 parts by weight, preferably 1 to 67 parts by weight per 100 parts by weight of the specific functional group-containing copolymer.

The elastomer material may further contain various kinds of additives, for example, lubricants, stabilizers such as antioxidants, heat stabilizers, weathering stabilizers, metal deactivators, ultraviolet absorbents, light stabilizers and copper inhibitors, antibacterial and mildewproofing agents, dispersing agents, plasticizers, nucleating agents, flame retardants, tackifiers, foaming aids, colorants such as titanium oxide and carbon black, pigments, fillers, such as metal powder such as ferrite, inorganic fibers such as glass fiber and metal fiber, organic fibers such as carbon fiber and aramid fiber, composite fibers, inorganic whiskers such as potassium titanate whiskers, glass beads, glass balloons, glass flakes, asbestos, mica, calcium carbonate, talc, silica, alumina, alumina silica, calcium silicate, hydrotalcite, kaolin, diatomaceous earth, graphite, pumice, ebonite powder, cotton flock, cork powder, barium sulfate, and polymer beads, or mixtures thereof, fillers such as polyolefin waxes, cellulose powder, rubber powder and wood powder, and low-molecular weight polymers as needed.

[Elastomer Material]

The elastomer material forming the olefinic thermoplastic elastomer sheet according to the present invention can be prepared in the following manner.

The specific functional group-containing copolymer is first prepared by copolymerizing ethylene, the specific α-olefin and the functional group-containing unsaturated monomer, and optionally the non-conjugated diene.

No particular limitation is imposed on the specific preparation process of the specific functional group-containing copolymer. However, the process described in Japanese Patent Application Laid-Open No. 2001-247629 may be suitably used.

The specific functional group-containing copolymer (hereinafter also referred to as "Component (A)") is then mixed with a metal compound (hereinafter also referred to as "Component (B)"), which supplies the metal ion for crosslinking this Component (A), and the other components used as needed under proper conditions that a crosslinked structure can be formed by Component (A) and Component (B), thereby obtaining the elastomer material.

As the metal compound making up Component (B), may be used a metal oxide, a metal hydroxide, a metal salt, an organic metal compound, a metal salt of a monovalent carboxylic acid, or the like.

Specific examples of the metal oxide used as Component (B) include CuO, MgO, BaO, ZnO, $Al_2O_3$, $Fe_2O_3$, SnO, CaO and $TiO_2$.

Specific examples of the metal hydroxide used as Component (B) include LiOH, NaOH, KOH, $Cu(OH)_2$, $Cu_2O(OH)_2$, $Mg(OH)_2$, $Mg_2O(OH)_2$, $Ba(OH)_2$, $Zn(OH)_2$, $Sn(OH)_2$ and $Ca(OH)_2$.

Specific examples of the organic metal compound used as Component (B) include organic aluminum compounds, organic titanium compounds, organic phosphorus compounds, organic boron compounds, organic zirconium compounds, organic gallium compounds, organic tin compounds, organic magnesium compounds, organic tellurium compounds, organic indium compounds, organic zinc compounds and organic vanadium compounds.

In the metal salt of the monovalent carboxylic acid used as Component (B), the carboxylic acid preferably has 3 to 23 carbon atoms. Specific examples of such a carboxylic acid include propionic acid, acrylic acid, butyric acid, methacrylic acid, valeric acid, hexanoic acid, octanoic acid, 2-ethylhexanoic acid, decanoic acid, palmitic acid, myristic acid, lauric acid, stearic acid, oleic acid, behenic acid, naphthenic acid and benzoic acid.

These metal compounds may be treated with a silane coupling agent or higher fatty acid for the purpose of improving their dispersibility in the specific functional group-containing copolymer that is Component (A).

These metal compounds may be used either singly or in any combination thereof.

The proportion of the metal compound used as Component (B) is generally 0.1 to 20 parts by weight, preferably 0.2 to 15 parts by weight, particularly 0.5 to 10 parts by weight per 100 parts by weight of the specific functional group-containing copolymer that is Component (A). If this proportion is less than 0.1 parts by weight, the resulting olefinic thermoplastic elastomer sheet becomes low in the crosslinking density, and the mechanical strength and mar resistance thereof are liable to lower. If this proportion exceeds 20 parts by weight on the other hand, the crosslinking density of the resulting olefinic thermoplastic elastomer sheet becomes too high, and so the flowability thereof may possibly be lowered. It is hence not preferable to use the metal compound in such a low or high proportion.

As a method of mixing and crosslinking the above-described Component (A), Component (B) and the other components used as needed, may be used various methods such as a method, in which solutions or dispersions of the respective components are prepared, and these solutions or dispersions are mixed, and a method using a melting and kneading device generally used. However, a method of mixing under heat is preferred in that an elastomer material having stable properties can be obtained. As specific examples thereof, may be mentioned the following methods (I) and (II).

(I) A method, in which a solution with the specific functional group-containing copolymer that is Component (A) dissolved in a proper solvent, a solution or dispersion with the metal compound that is Component (B) dissolved or dispersed in a proper solvent, and a solution or dispersion with the other components used as needed, such as the polymeric compound (hereinafter also referred to as "Component (C)") and the softening agent (hereinafter also referred to as "Component (D)"), dissolved or dispersed are mixed under heat to crosslink the copolymer, or in which Component (A) is dissolved in a proper solvent, and the solution is heated while dissolving or dispersing Component (B) and the other components used as needed, such as Component (C) and Component (D), in the solution or the solution is heated after dissolving or dispersing them.

(II) A method, in which the specific functional group-containing copolymer that is Component (A), the metal compound that is Component (B), and the other components used as needed, such as Component (C) and Component (D), are mixed, and the resultant mixture is subjected to a dynamic heat treatment to crosslink the copolymer.

No particular limitation is imposed on the solvent used in the method (I). However, for example, an aliphatic hydrocarbon, alicyclic hydrocarbon, aromatic hydrocarbon or a halide thereof is preferably used in that the specific functional group-containing copolymer is easily dissolved. As specific examples thereof, may be mentioned butane, pentane, hexane, heptane, 2-butane, 2-methyl-2-butane, cyclopentane, methylcyclopentane, cyclohexane, isooctane, benzene, toluene, xylene, chlorobenzene, dichloromethane and dichloroethane.

When the solubility of Component (B) used in the above-mentioned solvent is low, a dispersion with Component (B) dispersed in a suspended state in the solvent may be prepared. Alternatively, another solvent or additive may be added for dissolving Component (B).

When the solubility of Component (C) and Component (D) used in the above-mentioned solvent is low, a dispersion with Component (C) and Component (D) dispersed in a suspended state in the solvent may be prepared, another solvent or additive may be added for dissolving Component (C) and Component (D), or Component (C) and Component (D) may be added after the solvent is removed to subject them to a dynamic heat treatment.

The proportion of the specific functional group-containing copolymer in the solution is preferably 0.1 to 60% by weight, more preferably 0.2 to 50% by weight.

The total proportion of Component (B) and the activator in the solution or dispersion is preferably 0.01 to 60% by weight, more preferably 0.05 to 50% by weight.

The mixing of the solutions or dispersions may be conducted by a solution-stirring device generally used. The temperature upon mixing is preferably at least 20° C., more preferably at least 30° C.

Upon mixing of the solutions or dispersions, a proper catalyst may be added for accelerating the crosslinking reaction.

In the method (II), the term "dynamic heat treatment" means a treatment that both shearing force-applying treatment and heat treatment are conducted. Such dynamic heat treatment may be conducted by means of, for example, a melting and kneading apparatus. This melting and kneading apparatus may be either of a batch type or of a continuous type. As specific examples of the melting and kneading apparatus, may be mentioned batch type melting and kneading apparatus such as an open mixing roll, internal Banbury mixer and kneader, and continuous type melting and kneading apparatus such as a single screw extruder, same direction-rotating type continuous twin screw extruder and different direction-rotating type continuous twin screw extruder.

As examples of specific methods, may be mentioned the following methods (II-1) and (II-2).

(II-1) A method, in which a mixture containing the specific functional group-containing copolymer that is Component (A), the metal compound that is Component (B), and the other components used as needed, such as Component (C) and Component (D), is subjected to the dynamic heat treatment by heat generated by continuous shearing by means of a twin screw extruder to crosslink the copolymer, thereby preparing the elastomer material.

(II-2) A method, in which a mixture containing the specific functional group-containing copolymer that is Component (A), the metal compound that is Component (B), and the other components used as needed, such as Component (C) and Component (D), is subjected to a dynamic heat treatment by heat generated by shearing by means of a batch type kneader to crosslink the copolymer, thereby preparing the elastomer material.

Treatment conditions in the dynamic heat treatment vary according to the melting point of the specific functional group-containing copolymer used as Component (A), the kind of the metal compound used as Component (B), the melting point of the polymeric compound used as Component (C), the kind of the melting and kneading apparatus, etc. The treatment temperature is 120 to 350° C., preferably 150 to 290° C., and the treatment time is 20 seconds to 320 minutes, preferably 30 seconds to 25 minutes. The shearing force applied to the mixture is 10 to 20,000/sec, preferably 100 to 10,000/sec in terms of shear rate.

The elastomer material obtained in such a manner preferably has a melt flow rate (MFR) of at least 0.5 g/10 min, particularly at least 1 g/10 min as measured under conditions that a temperature is 230° C., and a load is 10 kg, a permanent set of at most 30%, particularly at most 25%, and a durometer A hardness of at most 96, particularly at most 90.

[Elastomer Sheet]

The olefinic thermoplastic elastomer sheet according to the present invention can be produced by molding or forming the elastomer material described above. However, it may also be produced by conducting a step of mixing the above-described Component (A), Component (B) and the other components used as needed under proper conditions that a crosslinked structure may be formed by Component (A) and Component (B) to prepare the elastomer material and a step of molding or forming by a single process.

No particular limitation is imposed on the molding or forming method, and various methods used as molding or forming methods of, for example, a thermoplastic resin sheet may be adopted. As such methods, extrusion, calendaring, solvent casting, injection molding, vacuum forming, powder slush molding and hot pressing may be suitably used. Among these, extrusion, injection molding and solvent casting are particularly preferred.

In the melting and molding or forming methods such as extrusion and injection molding, the molding or forming temperature is suitably preset according to the melting points of the specific functional group-containing copolymer and polymeric compound making up the elastomer material, the kind of the molding or forming machine used, and the like. However, it is generally 120 to 350° C.

No particular limitation is imposed on a solvent used in the solvent casting so far as it can dissolve the elastomer material. However, for example, an aliphatic hydrocarbon, an alicyclic hydrocarbon, an aromatic hydrocarbon or a halide thereof is preferably used. As specific examples thereof, may be mentioned butane, pentane, hexane, heptane, 2-butane, 2-methyl-2-butane, cyclopentane, methylcyclopentane, cyclohexane, isooctane, benzene, toluene, xylene, chlorobenzene, dichloromethane and dichloroethane.

Examples of processes for the solvent casting include a process, in which the respective components are dissolved or dispersed in a proper solvent, the resultant solution or dispersion is cast to remove the solvent, and crosslinking under heat is then conducted, or a process, in which heating is conducted after the casting, thereby performing removal of the solvent and crosslinking at the same time, and a process, in which a solution with the specific functional group-containing copolymer that is Component (A) dissolved in a proper solvent, a solution or dispersion with the metal compound that is Component (B) dissolved or dispersed in a proper solvent, and a solution or dispersion with the other components used as needed, such as Component (C) and Component (D), dissolved or dispersed are mixed, the resultant liquid mixture is cast to remove the solvents, and crosslinking under heat is then conducted, or a process, in which heating is conducted after the casting, thereby performing removal of the solvents and crosslinking at the same time.

The olefinic thermoplastic elastomer sheet obtained in such a manner preferably has a thickness of 10 µm to 2 cm, more preferably 20 µm to 1 cm.

[Laminate]

The laminate according to the present invention has a surface layer composed of the olefinic thermoplastic elastomer sheet described above.

As a lower lamination, on which the surface layer is formed, may be used that composed of a material selected from rubbers, plastics, thermoplastic elastomers, glass, metals, fabrics and wood.

Examples of the rubber include ethylene•α-olefin copolymer rubber and maleic anhydride-grafted polymers thereof, ethylene•α-olefin•non-conjugated diene terpolymer rubber, styrene•butadiene rubber, butadiene rubber, isoprene rubber, nitrile rubber and hydrogenated products thereof, acrylic rubber, silicone rubber, fluororubber, butyl rubber, and natural rubber.

Examples of the plastics include ionomers, aminoacrylamide polymers, polyethylene and maleic anhydride-grafted polymers thereof, polyisobutylene, ethylene-vinyl chloride polymers, ethylene-vinyl alcohol polymers, ethylene-vinyl acetate copolymers, polyethylene oxide, ethylene-acrylic acid copolymers, polypropylene and maleic anhydride-grafted polymers thereof, polyisobutylene and maleic anhydride-grafted polymers thereof, chlorinated polypropylene, 4-methylpentene-1 resins, polystyrene, ABS resins, ACS resins, AS resins, AES resins, ASA resins, MBS resins, acrylic resins, methacrylic resins, vinyl chloride resins, vinylidene chloride resins, polyamide resins, polycarbonate, acrylic resins, methacrylic resins, vinyl chloride resins, vinylidene chloride resins, vinyl alcohol resins, vinyl acetal resins, methyl methacrylate resins, fluororesins, polyether resins, polyethylene terephthalate, polyacrylates, polyamide resins, polyurethane, polyimide, polyurea resins, epoxy resins, phenol resins, urea resins, polybutene-1, methylpentene resins, and polyacrylonitrile.

Examples of the thermoplastic elastomers include chlorinated polyethylene type thermoplastic elastomers, syndiotactic 1,2-polybutadiene, simple blend type olefinic thermoplastic elastomers, implant type olefinic thermoplastic elastomers, dynamic crosslink type olefinic thermoplastic elastomers, polyvinyl chloride type thermoplastic elastomers, polyurethane type thermoplastic elastomers, polyester type thermoplastic elastomers, polyamide type thermoplastic elastomers, fluorine-containing thermoplastic elastomers, hydrogenated products of styrene•butadiene rubber, maleic anhydride-grafted polymers of hydrogenated products of styrene•butadiene rubber, hydrogenated products of butadiene rubber, maleic anhydride-grafted polymers of hydrogenated products of butadiene rubber, hydrogenated products of isoprene rubber, maleic anhydride-grafted polymers of hydrogenated products of isoprene rubber, hydrogenated products of styrene•isoprene rubber, maleic anhydride-grafted polymers of hydrogenated products of styrene•isoprene rubber, hydrogenated products of styrene•butadiene block copolymers, and hydrogenated products of styrene•isoprene block copolymers.

Examples of the metals include stainless steel, aluminum, iron, copper, nickel, zinc, lead, tin, and alloys used in automobiles, ships and household electric appliances, such as nickel-zinc alloys, iron-zinc alloys and lead-tin alloys.

As a process for forming the surface layer, may be utilized the above-described molding or forming process for obtaining the olefinic thermoplastic elastomer sheet.

When a base, which will become a lower lamination, is composed of a thermoplastic resin or thermoplastic elastomer in the case where the extrusion is used, a surface layer may be formed by extruding the elastomer material on the surface of the base produced in advance. However, the base, which will become a lower lamination, and the surface layer may be formed at the same time in the interior of a mold die by connecting at least 2 extruders to the mold die, supplying the thermoplastic resin and the elastomer material to one extruder and the other extruder, respectively, and operating both extruders at the same time. Such a process is described in, for example, Japanese Patent Application Laid-Open No. 2001-10418.

When a base, which will become a lower lamination, is composed of a thermoplastic resin or thermoplastic elastomer in the case where the injection molding is used, a surface layer may be formed by arranging the base produced in advance within a mold and injection-molding the elastomer material. However, the base, which will become a lower lamination, and the surface layer may be formed continuously within a mold by using 2 injection molding machines and the mold, supplying the elastomer material and the thermoplastic resin to one injection molding machine and the other injection molding machine, respectively, and continuously operating both injection molding machines.

When a base, which will become a lower lamination, is composed of glass, plastic or metal in the case where the solvent casting is used, a laminate may be produced by casting a solution or dispersion with the elastomer material dissolved or dispersed to remove the solvent, and then conducting crosslinking under heat, or by conducting heating after the casting, thereby conducting removal of the solvent and crosslinking at the same time.

[Application]

Since the olefinic thermoplastic elastomer sheets according to the present invention have the same rubber elasticity, flexibility and molding or forming and processing ability as those of the conventional olefinic thermoplastic elastomer sheets, and moreover are good in mechanical properties, excellent in mar resistance in particular, and good in adhesiveness to other materials, they can be easily laminated integrally on the surface of a lower lamination composed of another material into laminates.

Accordingly, the olefinic thermoplastic elastomer sheets according to the present invention and the laminates having a surface layer composed of such a sheet can, owning to the properties as described above, be widely used as interior or exterior skin materials for automobile bumpers, exterior moldings, window sealing gaskets, door sealing gaskets, trunk sealing gaskets, roof side rails, emblems, inner panels, door trims, console boxes, etc., in which the conventional olefinic thermoplastic elastomers are in use, weatherstrips and the like, leather sheets of which mar resistance is required, sealing materials, interior or exterior skin materials and the like for aircrafts and marine vessels, sealing materials, interior or exterior skin materials, waterproofing sheet materials and the like for civil engineering and construction, sealing materials and the like for general machines and apparatus, packings, skin materials, housings and the like for light electric parts, rolls and cleaning blades for information instruments, films for electronic parts, protecting films in the fabrication process of flat panel displays (FPD) such as semiconductor and liquid crystal display devices, protecting films for flat panel displays (FPD), chemical mechanical polishing pads (CMP pads) for semiconductors, sealing materials, protecting films for images such as photographs, decorative films for building materials, medical instrument parts, electric wires, and general processed products such as daily needs and sports goods.

EXAMPLES

The present invention will hereinafter be described specifically by the following Examples. However, the present invention is not limited thereto.

Respective components used in the following Examples and Comparative Examples are as follows.

[Olefin Random Copolymer]

(1) Specific functional group-containing copolymer (A-1):

A specific functional group-containing copolymer having a content of a structural unit derived from ethylene is 86.1 mol %, a content of a structural unit derived from propylene is 10.6 mol %, a content of a structural unit derived from 5-ethylidene-2-norbornene is 2.6 mol %, a content of a structural unit derived from 5-methyl-5-carboxy-bicyclo[2.2.1]-2-heptene is 0.7 mol %, and weight average molecular weight (Mw) of $16.5 \times 10^4$.

[Metal Compound]

(1) Metal Compound (B-1):

Magnesium hydroxide (product of Kyowa Chemical Industry Co., Ltd.; trade name "Kisuma 5N") surface-treated with a silane coupling agent.

(2) Metal Compound (B-2):

Magnesium stearate.

(3) Metal Compound (B-3):

Tetrabutoxyzirconium.

[Polymeric Compound]

(1) Polyethylene Resin (C-1):

A high density polyethylene resin (product of Japan Polychem Corp.; trade name "Novatec HDPE HJ490") having an MFR (temperature: 190° C. load: 2.16 kg) of 20 g/10 min.

(2) Polypropylene Resin (C-2):

A polypropylene resin (product of Chisso Corporation; trade name "XF9520") having an MFR (temperature: 230° C., load: 2.16 kg) of 20 g/10 min.

[Other Additives]

Antioxidant (D-1):

2-[1-(2-Hydroxy-3,5-di-t-pentylphenyl)ethyl]-4,6-di-t-pentylphenyl acrylate (product of Sumitomo Chemical Co., Ltd.; trade name "Sumilizer GS").

Colorant (E-1):

Carbon black master batch (polypropylene resin base, carbon black content: 30% by weight, product of Dainichiseika Color & Chemicals Mfg. Co., Ltd.; trade name "PPM-77255").

Example 1

A 10-L double arm pressure kneader (manufactured by MORIYAMA COMPANY LTD.) heated to 230° C. was charged with 100 parts by weight of the specific functional group-containing copolymer (A-1), 1.0 part by weight of the metal compound (B-1), 4.5 parts by weight of the metal compound (B-2), 0.3 parts by weight of the antioxidant (D-1) and 1.7 parts by weight of the colorant (E-1), and the contents were kneaded for 20 minutes at 40 rpm (shear rate: 200 sec$^{-1}$). The resultant massive kneaded product in a molten state was then pelletized by a feeder rudder (manufactured by MORIYAMA COMPANY LTD.) preset to 180° C. and 40 rpm to obtain an elastomer material pelletized.

The pellets of the elastomer material thus obtained were press-molded by means of an electric heating pressure press molding machine (manufactured by Kansai Roll Co., Ltd.) under conditions that a mold temperature was 180° C., pressurizing and heating time was 10 minutes, and pressurizing and cooling time was 5 minutes, thereby obtaining an olefinic thermoplastic elastomer sheet having a thickness of 2 mm, a length of 120 mm and a width of 120 mm.

[Evaluation of Elastomer Material]

With respect to the resultant elastomer material, its melt flow rate (MFR) was measured as an index to flowability under conditions of a temperature of 230° C. and a load of 10 kg. The result thereof is shown in the following Table 1.

The olefinic thermoplastic elastomer sheet thus obtained was used to measure durometer A hardness as an index to flexibility, permanent set as an index to rubber elasticity, tensile strength at break and tensile elongation at break as indexes to mechanical strength, and specific gravity in accordance with the following respective methods, and moreover conduct the following Mar Resistance Test 1 and Mar Resistance Test 2. The results thereof are shown in Table 1.

(1) Durometer A hardness: measured in accordance with JIS K 6253 as an index to flexibility.

(2) Permanent set: measured in accordance with JIS K 6262 as index to rubber elasticity.

(3) Tensile strength at break and tensile elongation at break: measured in accordance with JIS K 6251.

(4) Specific gravity: measured in accordance with JIS K 7112.

(5) Mar Resistance Test 1:

A Taber scratch tester manufactured by Toyo Seiki Seisaku-sho, Ltd. was used by scanning a metal claw (material:

tungsten carbide) loaded with 10 g on the surface of the sheet. This process was repeated with the load increased 10 g by 10 g until the surface of the molded sheet was marred, thereby recording a value of the load at the time the surface of the molded sheet had been marred. In this test, the greater the value of the load recorded, the better the mar resistance.

(6) Mar Resistance Test 2:

The surface of the sheet was rubbed with a thumb nail to visually judge the degree of marring on the surface in accordance with the following standard:
 1: The surface was not marred at all;
 2: The surface was slightly marred, but immediately restored to become marring-free;
 3: The surface was slightly marred; and
 4: The surface was deeply marred.

Example 2

A 10-L double arm pressure kneader (manufactured by MORIYAMA COMPANY LTD.) heated to 230° C. was charged with 100 parts by weight of the specific functional group-containing copolymer (A-1), 1.5 part by weight of the metal compound (B-1), 6.0 parts by weight of the metal compound (B-2), 20 parts by weight of the polyethylene resin (C-1), 7 parts by weight of the polypropylene resin (C-2), 0.3 parts by weight of the antioxidant (D-1) and 1.7 parts by weight of the colorant (E-1), and the contents were kneaded for 20 minutes at 40 rpm (shear rate: 200 sec$^{-1}$). The resultant massive kneaded product in a molten state was then pelletized by a feeder rudder (manufactured by MORIYAMA COMPANY LTD.) preset to 180° C. and 40 rpm to obtain an elastomer material pelletized.

The pellets of the elastomer material thus obtained were press-molded by means of an electric heating pressure press molding machine (manufactured by Kansai Roll Co., Ltd.) under conditions that a mold temperature was 180° C., pressurizing and heating time was 10 minutes, and pressurizing and cooling time was 5 minutes, thereby obtaining an olefinic thermoplastic elastomer sheet having a thickness of 2 mm, a length of 120 mm and a width of 120 mm. This olefinic thermoplastic elastomer sheet was evaluated in the same manner as in Example 1. The results are shown in Table 1.

Example 3

A 10-L double arm pressure kneader (manufactured by MORIYAMA COMPANY LTD.) heated to 230° C. was charged with 100 parts by weight of the specific functional group-containing copolymer (A-1), 1.5 part by weight of the metal compound (B-1), 6.0 parts by weight of the metal compound (B-2), 20 parts by weight of the polyethylene resin (C-1), 7 parts by weight of the polypropylene resin (C-2), 0.3 parts by weight of the antioxidant (D-1) and 1.7 parts by weight of the colorant (E-1), and the contents were kneaded for 20 minutes at 40 rpm (shear rate: 200 sec$^{-1}$). The resultant massive kneaded product in a molten state was then pelletized by a feeder rudder (manufactured by MORIYAMA COMPANY LTD.) preset to 180° C. and 40 rpm to obtain an elastomer material pelletized.

The pellets of the elastomer material thus obtained were injection-molded by means of an injection molding machine (manufactured by The Japan Steel Works, Ltd., Model "N-100"), thereby obtaining an olefinic thermoplastic elastomer sheet having a thickness of 2 mm, a length of 120 mm and a width of 120 mm. This olefinic thermoplastic elastomer sheet was evaluated in the same manner as in Example 1. The results are shown in Table 1.

Comparative Example 1

A 10-L double arm pressure kneader (manufactured by MORIYAMA COMPANY LTD.) heated to 230° C. was charged with 100 parts by weight of the specific functional group-containing copolymer (A-1), 0.3 parts by weight of the antioxidant (D-1) and 1.7 parts by weight of the colorant (E-1), and the contents were kneaded for 20 minutes at 40 rpm (shear rate: 200 sec$^{-1}$). The resultant massive kneaded product in a molten state was then pelletized by a feeder rudder (manufactured by MORIYAMA COMPANY LTD.) preset to 180° C. and 40 rpm to obtain an elastomer material pelletized.

The pellets of the elastomer material thus obtained were press-molded by means of an electric heating pressure press molding machine (manufactured by Kansai Roll Co., Ltd.) under conditions that a mold temperature was 180° C., pressurizing and heating time was 10 minutes, and pressurizing and cooling time was 5 minutes, thereby obtaining an olefinic thermoplastic elastomer sheet having a thickness of 2 mm, a length of 120 mm and a width of 120 mm. This olefinic thermoplastic elastomer sheet was evaluated in the same manner as in Example 1. The results are shown in Table 1.

TABLE 1

| | | Example 1 | Example 2 | Example 3 | Comparative example 1 |
|---|---|---|---|---|---|
| Proportion of components (parts by weight) | Specific functional group-containing copolymer (A-1) | 100 | 100 | 100 | 100 |
| | Metal compound (B-1) | 1.0 | 1.5 | 1.5 | — |
| | Metal compound (B-2) | 4.5 | 6 | 6 | — |
| | Metal compound (B-3) | — | — | — | — |
| | Polyethylene resin (C-1) | — | 20 | 20 | — |
| | Polypropylene resin (C-2) | — | 7 | 7 | — |
| | Antioxidant (D-1) | 0.3 | 0.3 | 0.3 | 0.3 |
| | Colorant (E-1) | 1.7 | 1.7 | 1.7 | 1.7 |
| Sheet | Forming and molding method | hot pressing | hot pressing | injection molding | hot pressing |
| | Thickness (mm) | 2 | 2 | 2 | 2 |
| Evaluation Results | MFR (230° C., 10 kg) [g/10 min] | 7 | 13 | 13 | 1 |
| | Durometer A hardness | 65 | 78 | 78 | 64 |
| | Permanent set [%] | 7 | 6 | 7 | 8 |

TABLE 1-continued

|  | Example 1 | Example 2 | Example 3 | Comparative example 1 |
|---|---|---|---|---|
| Tensile strength at break [MPa] | 15.0 | 15.6 | 10 | 8 |
| Tensile elongation at break [%] | 730 | 840 | 580 | 1000 |
| Specific gravity | 0.9 | 0.9 | 0.9 | 0.89 |
| Mar Registance Test 1 [g] | 480 | 130 | 100 | 10 |
| Mar Registance Test 2 | 1 | 1 | 1 | 4 |

As apparent from the results shown in Table 1, it is understood that the olefinic thermoplastic elastomer sheets according to Examples 1 to 3 are excellent in all the mar resistance, mechanical strength and rubber elasticity.

On the other hand, the elastomer sheet according to Comparative Example 1 used the copolymer which was not crosslinked by a metal ion, so that it was low in mechanical strength, rubber elasticity and mar resistance.

Example 4

A 10-L double arm pressure kneader (manufactured by MORIYAMA COMPANY LTD.) heated to 230° C. was charged with 100 parts by weight of the specific functional group-containing copolymer (A-1), 1.5 part by weight of the metal compound (B-1), 6.0 parts by weight of the metal compound (B-2), 20 parts by weight of the polyethylene resin (C-1), 7 parts by weight of the polypropylene resin (C-2), 0.3 parts by weight of the antioxidant (D-1) and 1.7 parts by weight of the colorant (E-1), and the contents were kneaded for 20 minutes at 40 rpm (shear rate: 200 $sec^{-1}$). The resultant massive kneaded product in a molten state was then pelletized by a feeder rudder (manufactured by MORIYAMA COMPANY LTD.) preset to 180° C. and 40 rpm to obtain an elastomer material pelletized.

The pellets of the elastomer material thus obtained were extruded by means of an extruder (manufactured by Hattori Haguruma Seishakusho Co., Ltd.; Model "MG427"; screw: single axis screw; ratio L/D of the length L of a flight part of the screw to the diameter D of the screw: 26; thickness of a T-die lip: 0.5 mm) equipped with a 500 mm T-die under conditions that a temperature within a cylinder was 210° C., and a screw rotating speed was 30 rpm, thereby obtaining an olefinic thermoplastic elastomer sheet having a thickness of 0.05 mm and a width of 500 mm.

The melt flow rate of the resultant elastomer material was measured under the same conditions as in Example 1 and was found to be 13 g/10 min.

With respect to the olefinic thermoplastic elastomer sheet thus obtained, the measurement of specific gravity, and Mar Resistance Test 1 and Mar Resistance Test 2 were conducted in the same manner as in Example 1. As a result, the results of the measurement of the specific gravity, and the evaluation of Mar Resistance Test 1 and Mar Resistance Test 2 were 0.9, 120 g and 1, respectively. The tensile strength at break and tensile elongation at break of this olefinic thermoplastic elastomer sheet were measured in accordance with JIS K7127. As a result, the results of the measurement of the tensile strength at break and tensile elongation at break were 29.1 MPa and 510%, respectively.

Example 5

A 200-mL flask purged with nitrogen was charged with 3 g of the specific functional group-containing copolymer (A-1) and 120 mL of dry toluene to dissolve the copolymer at 80° C. After this solution was cooled to room temperature, 11 mL of a 0.5 mol/L toluene solution of the metal compound (B-3) was added to the solution, and the resultant mixture was stirred for 30 minutes.

After the resultant solution mixture was cast on a glass plate at room temperature and air-dried for 12 hours, the copolymer was crosslinked by heating for 4 hours at 80° C. under vacuum. A film formed on the glass plate was then peeled, thereby obtaining an olefinic thermoplastic elastomer sheet having a thickness of 210 μm.

With respect to the olefinic thermoplastic elastomer sheet thus obtained, Mar Resistance Test 1 and Mar Resistance Test 2 were conducted in the same manner as in Example 1. As a result, the results of the evaluation of Mar Resistance Test 1 and Mar Resistance Test 2 were 130 g and 1, respectively.

The total haze of the resultant olefinic thermoplastic elastomer sheet was measured in accordance with JIS K6782 and was found to be 2%.

Example 6

A 10-L double arm pressure kneader (manufactured by MORIYAMA COMPANY LTD.) heated to 230° C. was charged with 100 parts by weight of the specific functional group-containing copolymer (A-1), 1.5 part by weight of the metal compound (B-1), 6.0 parts by weight of the metal compound (B-2), 20 parts by weight of the polyethylene resin (C-1), 7 parts by weight of the polypropylene resin (C-2), 0.3 parts by weight of the antioxidant (D-1) and 1.7 parts by weight of the colorant (E-1), and the contents were kneaded for 20 minutes at 40 rpm (shear rate: 200 $sec^{-1}$). The resultant massive kneaded product in a molten state was then pelletized by a feeder rudder (manufactured by MORIYAMA COMPANY LTD.) preset to 180° C. and 40 rpm to obtain an elastomer material pelletized.

An injection molding machine (manufactured by The Japan Steel Works, Ltd., Model "JSW220E-P2M") was used to injection-mold the polypropylene resin (C-2) under conditions of a molding temperature of 200° C. and a mold temperature of 50° C. in accordance with a DSI (Die Slide Injection) method (see Plastic Age, the August number, p. 74 (2002)), thereby producing a hollow cylindrical base having a thickness of 20 mm and a diameter of 53 mm. The elastomer material obtained above was molded to integrally form a surface layer composed of an olefinic thermoplastic elastomer sheet having a thickness of 1 mm and a diameter of 40 mm on the surface of an end of the base, thereby obtaining a laminate.

With respect to the surface layer of the laminate thus obtained, Mar Resistance Test 1 and Mar Resistance Test 2 were conducted in the same manner as in Example 1. As a result, the results of the evaluation of Mar Resistance Test 1 and Mar Resistance Test 2 were 100 g and 1, respectively.

When the surface layer in the laminate was intended to be separated from the base, the surface layer was not separated at its interface with the base, but broken. It was thus confirmed that this laminate was good in adhesiveness between the surface layer and the base.

The invention claimed is:

1. An olefin thermoplastic elastomer sheet composed of an elastomer material comprising an olefin random copolymer formed by copolymerizing ethylene, an α-olefin having 3 to 10 carbon atoms and an unsaturated monomer having a functional group, and optionally a non-conjugated diene, and metal ions crosslinking the olefin random copolymer, wherein the said unsaturated monomer having a functional group is a functional cyclic compound represented by the following general formula (1):

General formula (1):

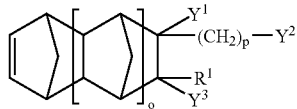

wherein $R^1$ represents a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or —COOH, with the proviso that at least one of $Y^1$, $Y^2$ and $Y^3$ is —COOH, and when at least two of $Y^1$, $Y^2$ and $Y^3$ are —COOH, they may be bonded to each other to form an acid anhydride (—CO—(O)—CO—), o is an integer of 0 to 2, and p is an integer of 0 to 5.

2. The olefin thermoplastic elastomer sheet according to claim 1, wherein the elastomer material further comprises a polymeric compound selected from the group consisting of a thermoplastic resin, a thermoplastic elastomer rubber, and a rubber softening agent.

3. The olefin thermoplastic elastomer sheet according to claim 1, which has a thickness of 10 μm to 2 cm.

4. A process for producing an olefinic thermoplastic elastomer sheet, which comprises forming or molding the elastomer material according to claim 1 by extrusion, calendering, solvent casting, injection molding, vacuum forming, powder slush molding or hot pressing.

5. A laminate comprising a surface layer composed of the olefinic thermoplastic elastomer sheet according to claim 1.

6. The laminate according to claim 5, wherein a lower lamination is composed of a material selected from the group consisting of rubbers, plastics, thermoplastic elastomers, glass, metals, fabrics and wood.

7. The olefin thermoplastic elastomer sheet according to claim 1, which has a thickness of 20 μm to 1 cm.

8. The olefin thermoplastic elastomer sheet according to claim 1, wherein the metal ions are ions of a metal selected from the group consisting of potassium, sodium, aluminum, magnesium, barium, zinc, iron, calcium, titanium and lead.

9. The olefin thermoplastic elastomer sheet according to claim 1, wherein the copolymer has a glass transition temperature of −90° C. to 50° C.

10. The olefin thermoplastic elastomer sheet according to claim 1, wherein the copolymer has a glass transition temperature of −70° C. to 10° C.

11. The olefin thermoplastic elastomer sheet according to claim 1 wherein the elastomer material has a melt flow rate of at least 0.5 g/10 min as measured under conditions of a temperature of 230° C. and a load of 10 kg, a permanent set of at most 30% and a durometer A hardness of at most 96.

12. The olefin thermoplastic elastomer sheet according to claim 1, wherein the elastomer material has a melt flow rate of at least 1 g/10 min as measured under conditions of a temperature of 230° C. and a load of 10 kg, a permanent set of at most 25% and a durometer A hardness of at most 90.

* * * * *